April 7, 1959   G. F. DALES   2,881,290
THERMOSTAT
Filed Aug. 28, 1957

*INVENTOR.*
GEORGE FRANKLIN DALES
BY
ATTORNEY

United States Patent Office 2,881,290
Patented Apr. 7, 1959

2,881,290

THERMOSTAT

George Franklin Dales, Akron, Ohio

Application August 28, 1957, Serial No. 680,744

10 Claims. (Cl. 200—138)

This invention relates to an improved thermostat. It includes a new electrode-containing plug for insertion in one end of the thermostat, and the method of assembling the thermostat.

The casing of the thermostat is metal tubing. The structure relates primarily to small thermostats about an inch or two in length and ordinarily not over one-quarter or three-eighths inch in diameter, which are used in the windings to motors to prevent their burning out, and in certain electrical equipment such as toasters and irons to regulate their temperatures. The tubing is ordinarily copper, but may be bronze, steel, Monel metal, or other metal which is a good conductor of both heat and electricity.

In the thermostat of this invention the electrode in one end of the thermostat is a rigid electrode which is held in a plug which is preferably of glass although other fusible insulating material may be used. The glass or other fusible material is fused to the electrode. A metal sheath encircles the plug, and a narrow flange of the metal extends outwardly from the outer end of this sheath. The plug is hermetically sealed in one end of the casing of the thermostat by soldering or welding this flange or the sheath or both to the tubing. The end of the tubing which holds the plug is usually circular, although it may be oval.

The other electrode may be incorporated in the thermostat in any desired manner. It is preferably held in the other end of the tubing by flattening the tubing against it. This electrode includes a bimetallic element which causes it to flex into and out of contact with the rigid electrode. The bimetallic element may constitute this entire electrode, or the bimetallic element may be used with a spring element placed in contact with it. The two electrodes make and break contact within the casing.

The invention will be further described in connection with the accompanying drawings, in which—

The casing or tubing 1 is preferably composed of copper but may be of other metal. Whether the casing be round or oval, the rigid electrode assembly fits snugly into it.

Figure 1:
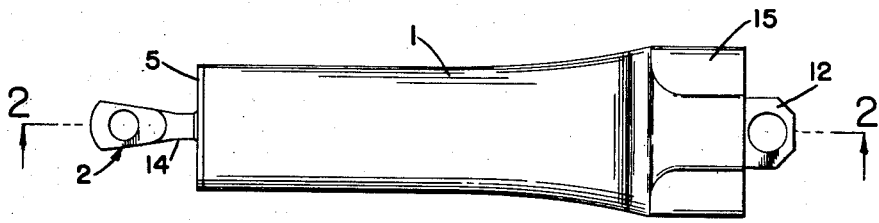
Fig. 1 is a plan view of the thermostat.
Figure 2:
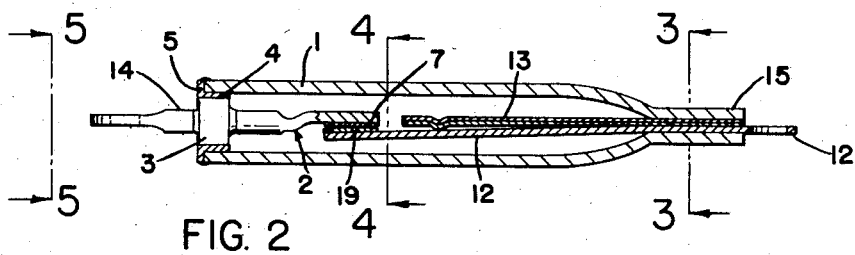
Fig. 2 is a section through the thermostat on the line 2—2 of Fig. 1.
Figure 3:
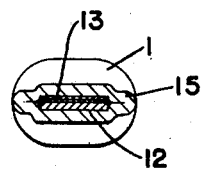
Fig. 3 is a section through the thermostat on the line 3—3 of Fig. 2.
Figure 4:
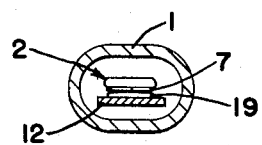
Fig. 4 is a section through the thermostat on the line 4—4 of Fig. 2.
Figure 5:
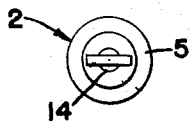
Fig. 5 is an end view of the end of the thermostat which contains the rigid electrode, taken on line 5—5 of Fig. 2.

The rigid electrode assembly is prefabricated from the rigid electrode 2 by fusing the plug 3 (Fig. 2) around it. Any method of bonding the fused glass to the electrode may be employed. Canadian 542,552 describes one such method. Fusible plugs (ordinarily of glass) with electrodes passing through them, and surrounded by a sheath of metal, have been used widely in the electronics industry. The rigid electrode assembly of this invention is similarly made, but includes the contact point, usually of silver, welded to it. The electrode is usually of steel, but may be a nichrome alloy, or other metal to which the glass or other fusible material is fusible. The electrode is preferably not straight, but bent toward the casing, so that the exposed surface of the contact point is at substantially the middle of the casing.

The metal sheath 4 provided with the metal flange 5 (usually formed of steel) is fused to the plug 3. The sheath 4, if of steel, may be coated with zinc so that it can be welded directly to the casing of the electrode, if the casing is copper. Alternatively, the sheath and/or the flange may be soldered to the casing. The silver button 7 is welded onto the inner end of this electrode.

Figure 6:
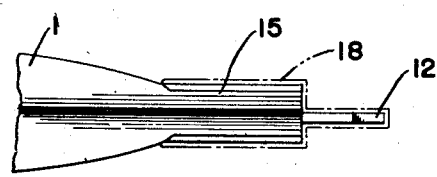
Fig. 6 is a side view of the other end of the preferred type of thermostat described more particularly herein.
Figure 7:
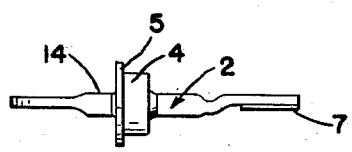
Fig. 7 is a detail of the rigid electrode before assembly in the thermostat.

The showing of the electrode 12 and bimetallic element 13 is conventional and is intended to illustrate any type of flexible electrode with a bimetallic element in operative relation therewith, including an electrode which is itself a bimetallic element. The end 15 of the casing is flattened down against the electrode to hold it in place. The whole of this end of the thermostat may be dipped in solder, as shown in dotted lines at 18 in Fig. 6, if desired, to form a coating to make sure that the electrode 12 is fastened firmly in place. The element 12 is of spring steel and tends to make contact with the other electrode at its inner end. When the two electrodes are in contact the circuit is completed through the two silver contact points 7 and 19. The bimetallic element 13 bends downwardly at its inner end as the temperature of the casing rises, and this separates the electrode 12 from the rigid electrode 2.

The sub-assembly of the rigid electrode is inserted in one end of the electrode, either before or after the other electrode is fastened in the casing by flattening the casing on to it. The rigid electrode is welded into its end of the casing or it may be soldered by using a small amount of solder between the flange 5 and the tubing.

The thermostat is calibrated by connecting the ends of the electrode into a circuit with a signaling device such as a light, heating the casing to the temperature at which the thermostat is to operate, and then bending the flattened end 15 with respect to the rest of the casing, until it just makes operating contact with the electrode 2.

Although glass is the preferred insulation for the manufacture of the plug, fusible resinous insulating materials may be used. Although the post 14 is ordinarily of steel, other metals may be utilized. Although the thermostat shown and more particularly described has only one plug electrode, both ends of the casing may be closed by such an electrode. Various changes may be made in the thermostat more particularly described without avoiding the claims.

What I claim is:

1. A plug for enclosing one end of the tubular metal casing of a thermostat which plug includes a round steel electrode in glass which is fused thereto, a silver contact point on the inner end of the electrode, which contact point faces a projection of the radial center of the plug and lies a short distance therefrom, a steel sheath surrounding the glass and fused thereto, and a flange of steel extending outwardly from the outer edge of the sheath.

2. A thermostat which includes a tubular metal casing having in one end thereof an electrode which includes a bimetallic element having a silver contact at its inner end, and a plug in the other end of the casing, said plug including a steel electrode in glass which is fused thereto and a steel sheath surrounding the glass and fused thereto, the sheath being hermetically sealed to the casing, and a silver contact on the steel electrode with which the silver contact on the other electrode is adapted to make contact.

3. The thermostat of claim 2 in which the end of the casing in which the electrode which includes the bimetallic element is located, is flattened into contact with that electrode.

4. The thermostat of claim 2 in which the sheath is welded in the casing.

5. A thermostat which includes a tubular metal casing and has hermetically sealed in one end thereof a plug of insulating material with a bimetallic electrode passing therethrough, the insulating material being fused to the electrode.

6. In a thermostat formed of a tubular metal casing having therein an electrode actuated by bimetallic means, the improvement which comprises a plug of fused insulating material in at least one end of the casing with a bimetallic electrode passing therethrough, the inner ends of the respective electrodes being adapted to make and break contact within the casing.

7. The improved thermostat of claim 6 in which the fused insulating material is glass.

8. The improved thermostat of claim 6 in which there is a plug in only one end of the casing, and the electrode passing through the plug is rigid.

9. The method of assembling a thermostat formed of metal tubing and a fused insulating plug which holds a bimetallic electrode and is surrounded by metal, which method comprises soldering the plug in one end of the casing.

10. The method of assembling a thermostat formed of metal tubing and a fused insulating plug which holds a bimetallic electrode and is surrounded by metal, which method comprises inserting the plug in the casing and soldering the casing to said metal which surrounds the plug.

References Cited in the file of this patent

UNITED STATES PATENTS

| | | |
|---|---|---|
| 2,747,054 | Valverde | May 22, 1956 |
| 2,773,962 | Perst | Dec. 11, 1956 |
| 2,792,474 | Dales | May 14, 1957 |